US009262002B2

(12) United States Patent
Momeyer et al.

(10) Patent No.: US 9,262,002 B2
(45) Date of Patent: Feb. 16, 2016

(54) FORCE SENSING TOUCH SCREEN

(75) Inventors: Brian Momeyer, Carlsbad, CA (US); Kevin M. Beckwith, San Diego, CA (US); Hui-Ya L. Nelson, San Diego, CA (US); Andre Gustavo P. Schevciw, San Diego, CA (US); Louis Dominic Oliveira, San Diego, CA (US); Wade L. Heimbigner, Poway, CA (US); Babak Forutanpour, Carlsbad, CA (US)

(73) Assignee: QUALCOMM Incorporated, San Diego, CA (US)

( * ) Notice: Subject to any disclaimer, the term of this patent is extended or adjusted under 35 U.S.C. 154(b) by 55 days.

(21) Appl. No.: 12/939,078

(22) Filed: Nov. 3, 2010

(65) Prior Publication Data
US 2012/0105358 A1 May 3, 2012

(51) Int. Cl.
*G06F 3/041* (2006.01)
*G06F 3/0485* (2013.01)
*G06F 3/0488* (2013.01)

(52) U.S. Cl.
CPC ............ *G06F 3/0414* (2013.01); *G06F 3/0485* (2013.01); *G06F 3/04883* (2013.01); *G06F 2203/04105* (2013.01)

(58) Field of Classification Search
CPC ....... G06F 3/0414; G06F 3/041; G06F 3/045; G06F 3/04845; G06F 3/04847; G06F 2203/04105
USPC .................................................. 345/173–177
See application file for complete search history.

(56) References Cited

U.S. PATENT DOCUMENTS

| 5,699,082 | A | * | 12/1997 | Marks et al. ................... 345/157 |
| 5,887,995 | A | * | 3/1999 | Holehan ..................... 400/479.1 |
| 7,046,230 | B2 | * | 5/2006 | Zadesky et al. ................ 345/156 |
| 7,111,179 | B1 | | 9/2006 | Girson et al. |
| 7,176,897 | B2 | * | 2/2007 | Roberts ......................... 345/173 |

(Continued)

FOREIGN PATENT DOCUMENTS

| CN | 1808362 A | 7/2006 |
| CN | 1881146 A | 12/2006 |

(Continued)

OTHER PUBLICATIONS

International Search Report and Written Opinion—PCT/US2011/059064—ISA/EPO—Mar. 5, 2012.

(Continued)

*Primary Examiner* — William Boddie
*Assistant Examiner* — Bryan Earles
(74) *Attorney, Agent, or Firm* — Shirin Tefagh; Joseph Agusta

(57) ABSTRACT

A computing device includes a touch screen display with a plurality of force sensors, each of which provides a signal in response to contact with the touch screen display. Using force signals from the plurality of force sensors, a characteristic of the contact is determined, such as the magnitude of the force, the centroid of force and the shear force. The characteristic of the contact is used to select a command which is processed to control the computing device. For example, the command may be related to manipulating data displayed on the touch screen display, e.g., by adjusting the scroll speed or the quantity of data selected in response to the magnitude of force, or related to an operation of an application on the computing device, such as selecting different focal ranges, producing an alarm, or adjusting the volume of a speaker in response to the magnitude of force.

34 Claims, 11 Drawing Sheets

(56) References Cited

U.S. PATENT DOCUMENTS

| | | | |
|---|---|---|---|
| 7,190,350 B2* | 3/2007 | Roberts | 345/173 |
| 7,196,694 B2* | 3/2007 | Roberts | 345/173 |
| 7,245,293 B2* | 7/2007 | Hoshino et al. | 345/173 |
| 7,450,110 B2 | 11/2008 | Shahoian et al. | |
| 7,479,949 B2 | 1/2009 | Jobs et al. | |
| 7,609,178 B2* | 10/2009 | Son et al. | 341/33 |
| 7,650,519 B1 | 1/2010 | Hobbs et al. | |
| 7,663,607 B2* | 2/2010 | Hotelling et al. | 345/173 |
| 7,800,592 B2* | 9/2010 | Kerr et al. | 345/173 |
| 7,903,090 B2* | 3/2011 | Soss et al. | 345/173 |
| 7,945,153 B2 | 5/2011 | Lin | |
| 7,973,773 B2* | 7/2011 | Pryor | 345/173 |
| 8,144,453 B2* | 3/2012 | Brown et al. | 361/679.21 |
| 2004/0156168 A1 | 8/2004 | LeVasseur et al. | |
| 2005/0010694 A1 | 1/2005 | Ma et al. | |
| 2005/0052430 A1 | 3/2005 | Shahoian et al. | |
| 2006/0026521 A1* | 2/2006 | Hotelling et al. | 715/702 |
| 2006/0132455 A1 | 6/2006 | Rimas-Ribikauskas et al. | |
| 2006/0132457 A1 | 6/2006 | Rimas-Ribikauskas et al. | |
| 2006/0138983 A1 | 6/2006 | Lee et al. | |
| 2006/0244733 A1* | 11/2006 | Geaghan | 345/173 |
| 2006/0250377 A1* | 11/2006 | Zadesky et al. | 345/173 |
| 2007/0226527 A1 | 9/2007 | Ang | |
| 2008/0059888 A1 | 3/2008 | Dunko | |
| 2008/0062143 A1 | 3/2008 | Shahoian et al. | |
| 2008/0105470 A1 | 5/2008 | Van De Ven et al. | |
| 2008/0150911 A1 | 6/2008 | Harrison | |
| 2008/0165153 A1 | 7/2008 | Platzer et al. | |
| 2008/0165160 A1 | 7/2008 | Kocienda et al. | |
| 2008/0167081 A1 | 7/2008 | Eng | |
| 2008/0168395 A1 | 7/2008 | Ording et al. | |
| 2008/0201587 A1 | 8/2008 | Lee | |
| 2008/0231605 A1* | 9/2008 | Yang | 345/173 |
| 2008/0238884 A1* | 10/2008 | Harish | 345/174 |
| 2008/0259046 A1* | 10/2008 | Carsanaro | 345/173 |
| 2009/0058830 A1 | 3/2009 | Herz et al. | |
| 2009/0061823 A1* | 3/2009 | Chu | 455/411 |
| 2009/0160781 A1 | 6/2009 | Henderson et al. | |
| 2009/0167700 A1 | 7/2009 | Westerman et al. | |
| 2010/0005390 A1 | 1/2010 | Bong | |
| 2010/0053116 A1* | 3/2010 | Daverman et al. | 345/175 |
| 2010/0079395 A1 | 4/2010 | Kim et al. | |
| 2010/0090973 A1* | 4/2010 | Algreatly | 345/173 |
| 2010/0117959 A1* | 5/2010 | Hong et al. | 345/158 |
| 2010/0177057 A1* | 7/2010 | Flint et al. | 345/174 |
| 2010/0214239 A1* | 8/2010 | Wu | 345/173 |
| 2011/0063248 A1* | 3/2011 | Yoon | 345/174 |
| 2011/0141052 A1* | 6/2011 | Bernstein et al. | 345/174 |

FOREIGN PATENT DOCUMENTS

| | | | |
|---|---|---|---|
| CN | 101620507 A | | 1/2010 |
| EP | 2224313 A1 | | 9/2010 |
| EP | 2267585 A2 | | 12/2010 |
| JP | S63280325 A | | 11/1988 |
| JP | H11184616 A | | 7/1999 |
| JP | 2004287640 A | | 10/2004 |
| JP | 2006268073 A | | 10/2006 |
| JP | 2008508631 A | | 3/2008 |
| JP | 2009218693 A | | 9/2009 |
| JP | 2011516948 A | | 5/2011 |
| KR | 20050107424 A | | 11/2005 |
| TW | 200940970 A | | 10/2009 |
| TW | 201019030 A | | 5/2010 |
| WO | WO2006013521 A2 | | 2/2006 |
| WO | 2008085744 | | 7/2008 |
| WO | 2008085770 | | 7/2008 |
| WO | 2009145455 A2 | | 12/2009 |
| WO | 2010055455 | | 5/2010 |
| WO | WO2010055195 A1 | | 5/2010 |

OTHER PUBLICATIONS

Taiwan Search Report—TW100140158—TIPO—Feb. 11, 2013.
Fels, Sidney, "Designing for Intimacy: Creating New Interfaces for Musical Expression", Proceedings of the IEEE. vol. 92, No. 4, Apr. 2004, pp. 672-685.

* cited by examiner

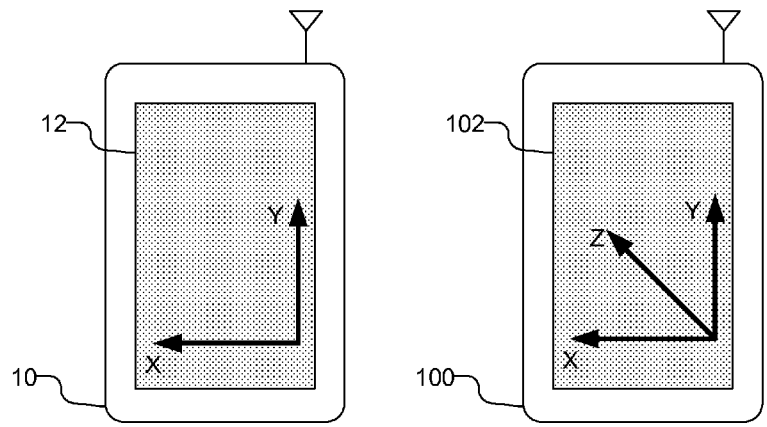
Fig. 1
(Conventional)
Fig. 2
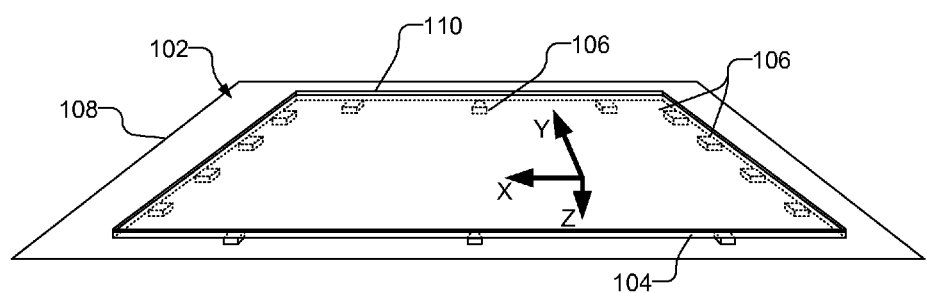
Fig. 3

FORCE SENSING TOUCH SCREEN

BACKGROUND

Touch screen displays have become ubiquitous in current mobile platform applications, such as smart phones. Touch screen displays eliminate the need for key pads. In one adaptation, touch screen displays are used, not only as a replacement of key pads, but as a user interface that detects user gestures on the touch screen and translates the gestures into desired commands to be performed.

Touch screen displays are, conventionally, an LCD (liquid crystal display) technology, or an LPD (light emitting polymer display) technology. The screens are overlaid with a touch sensor, which use touch sensing technology such as capacitive, resistive, infrared, and surface acoustic wave technologies, to determine one or more points of contact with the touch screen. The touch sensing technologies, however, receive information in two-dimensions in the plane of the display. FIG. 1, by way of example, illustrates a conventional mobile platform 10 with a touch screen display 12 that detects two-dimensional touch information, i.e., along the X-axis and along the Y-axis. In other words, the touch sensor on the touch screen display 12 detects the position of contact on the touch screen display 12. Some touch sensing technologies, such as capacitive sensors, may detect how close an object is to the touch screen display 12, but ultimately determines the object to be in contact when the detected parameter, e.g., capacitance, is within a specified threshold. Thus, such touch sensing technology is really detecting only two-dimensional information, i.e., whether the object is close enough to be considered contact and if so, the two-dimensional position of that contact.

Thus, conventional touch screen displays function as a two-dimensional user interface, thereby limiting the user's interfacing opportunities and the devices response thereto.

SUMMARY

A computing device includes a touch screen display with a plurality of force sensors, each of which provides a signal in response to contact with the touch screen display. By way of example, the force sensors may be resistive force sensors that are positioned around the perimeter of the bottom surface of the touch screen display. Using the force signals from the plurality of force sensors, a characteristic of the contact is determined, such as the magnitude of the force, the centroid of force and the shear force. The characteristic of the contact is used to select a command which is processed to control the computing device.

The selected command may be related to manipulating data displayed on the touch screen display, e.g., by adjusting the scroll speed or the quantity of data selected in response to the magnitude of force. The selected command may also be related to the operation of an application on the computing device. For example, different focal ranges of a camera may be selected in response to the magnitude of the force. Other example, include producing an alarm when the magnitude of the force indicates that the touch screen display may be suffering damage from a contact or adjusting the volume of a speaker, audio frequency equalization, or active noise cancellation in response to the magnitude of force applied to the touch screen display. Additional functions and operations are possible in response to the magnitude of the force, the centroid of force and the shear force detected in response to the contact with the touch screen display.

BRIEF DESCRIPTION OF THE DRAWING

FIG. 1 illustrates a conventional mobile platform with a touch screen display that detects two-dimensional touch information.

FIG. 2 illustrates a computing device with a touch screen display that detects three-dimensional touch information.

FIG. 3 illustrates a perspective view of the touch screen display with force sensors to detect three-dimensional touch information.

DETAILED DESCRIPTION

Figure 4:
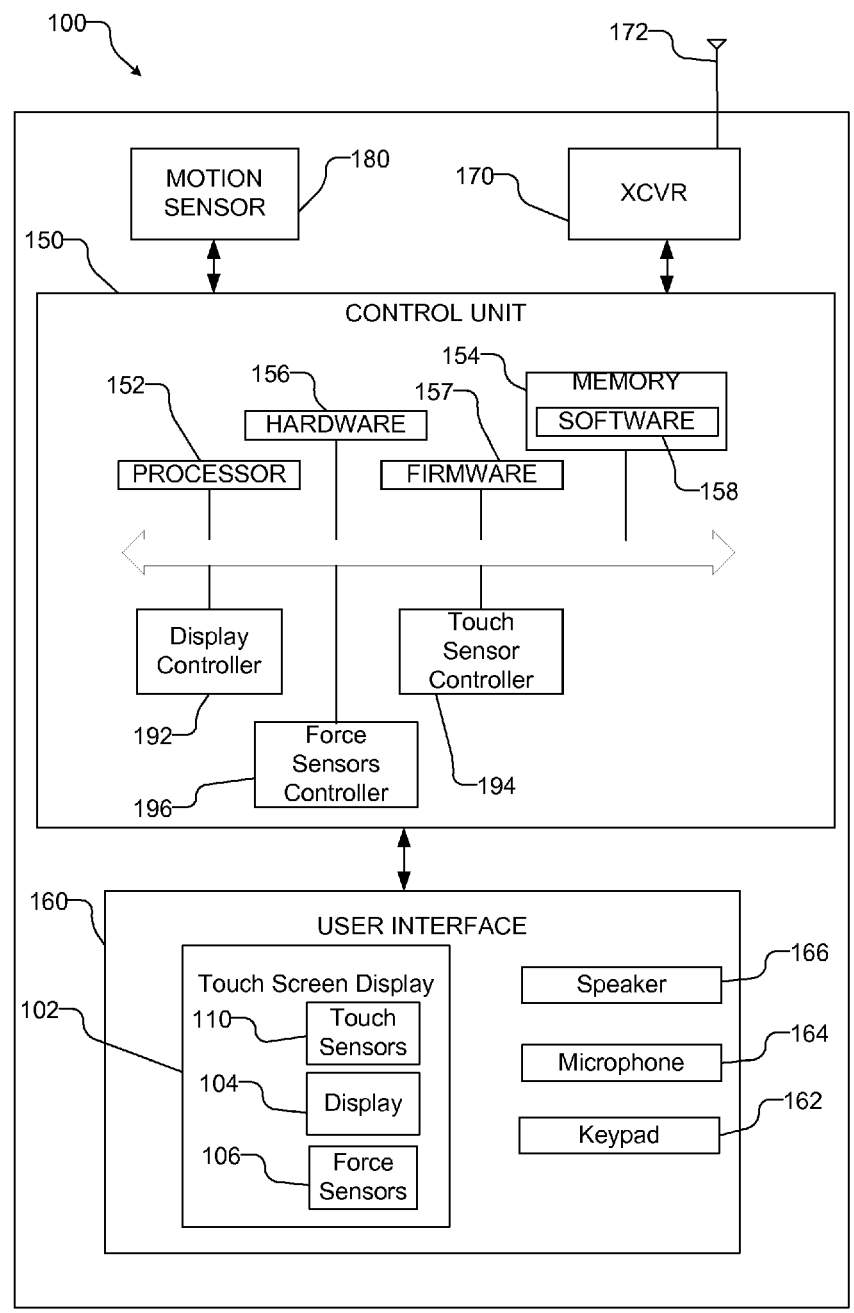
FIG. 4 is a block diagram of a computing device with a touch screen display with force sensors and capable of supporting commands prompted by three-dimensional user interfacing.

FIG. 2 illustrates a computing device 100 with a touch screen display 102 that detects touch information in three-dimensions, i.e., along the X-axis, the Y-axis, and the Z-axis. With the addition of Z-axis information, the touch screen display 102 permits three-dimensional gestures or interfacing and is not limited to simple two-dimensional gestures on the surface of the touch screen.

The computing device 100 may be a mobile platform, such as a cellular or other wireless communication device, personal communication system (PCS) device, personal navigation device (PND), Personal Information Manager (PIM), Personal Digital Assistant (PDA), laptop or other suitable mobile device or any other suitable stationary computing device, including a desk top computer or other similar device. "Computing device" is, thus, intended to include all devices, including wireless communication devices, computers, laptops, etc. with a user interface that includes a touch screen display.

FIG. 3 illustrates a perspective view of the touch screen display 102 of the computer device 100 with the X, Y, and Z axes. Touch screen display 102 includes a display element 104, such as an LCD display, LPD display or other appropriate display, and includes a plurality of force sensors 106 located, e.g., around the perimeter of the display element 104 between the display element 104 and a frame for the housing 108 in the case of the computing device 100. The force sensors 106 may be adhesively attached to the housing 108 and the display element 104. Thus, the display element 104 is connected to the housing 108 through the force sensors 106. As illustrated in FIG. 3, four force sensors 106 are located on the left and right sides of the display element 104 and three force sensors 106 are located along the top and the bottom sides of the display element 104. More or fewer force sensors 106 and different arrangements than illustrated in FIG. 3 may be used if desired. For example, four force sensors 106 may be used, one in each corner of the display element 104. If desired, force sensors 106 may be located in the center of the display element 104, as opposed to or in addition to being arranged around the perimeter. The force sensors 106 may be capacitive force sensors, such as that produced by PPS Touch Technology Inc, Stantum Inc., Peratech Ltd., or Artificial Muscle, Inc. Other force sensors, such as resistive force sensors, such as that produced by Interlink Inc., may be used if desired. In addition, piezoelectric force sensors, such as polymer types produced by Measurement Specialties Inc. or ceramic types produced by Murata Inc.

A force sensor 106 detects the force or amount of force applied to the sensor. With a plurality of force sensors 106 arranged between the display element 104 and the housing 108, the force sensors 106 can be used together to determine the force applied to the display element 104 in the Z-axis, as well as the centroid of the force along the X and Y axes. For example, a touch applied to the top left corner of the display element 104 will produce a greater force reading by the force sensors 106 near the top left corner than the force sensors 106 near the bottom right corner.

Calibration may be performed to compensate for possible deformation of the glass or plastic in the display element 104 when force is applied. Calibration may be performed by applying known forces to specific areas of the display element 104 and adjusting the resulting force reading along the Z axis as well as the centroid of force along the X and Y axes to correspond with the known forces and the specific areas that the forces are applied. The touch screen display 102 may further include a conventional touch sensor 110 over the display element 104, which may be capacitive, resistive, infrared, and surface acoustic wave technologies. The touch sensor 110 may be used in the calibration of the force sensors 106 by ensuring that the centroid of force determined by the force sensors 106 is closely aligned, e.g., centered, with the touch location identified by the touch sensor 110.

FIG. 4 is a block diagram of a computing device 100 with a touch screen display 102 with force sensors 106 capable of supporting commands prompted by three-dimensional user interfacing. The computing device 100 is a system that includes means for receiving force measurements from a plurality of locations of a touch screen display in response to contact with the touch screen display, which may include, e.g., the force sensors 106 as well as a control unit 150 that may include a processor 152 and associated memory 154, hardware 156, software 158, and firmware 157.

Computing device 100 includes a user interface 160 that is in communication with the control unit 150, e.g., the control unit 150 accepts data and controls the user interface 160. It should be understood that with some computing devices, such as a desk top computer, the touch screen display 102 may is physically separated from the control unit 150 and is connected to the control unit 150 via cables or wirelessly. The user interface 160 includes the touch screen display 102, which includes a means for displaying graphics, text, and images, such as the display element 104. The touch screen display 102 further includes a means for detecting a magnitude and location of the force applied to the touch screen display 102, such as the force sensors 106 discussed above. If desired, the touch screen display 102 may further include a means for detecting a touch of the display element 104, such as the touch sensors 110.

The user interface 160 may further include a keypad 162 or other input device through which the user can input information into the computing device 100. If desired, the keypad 162 may be obviated by integrating a virtual keypad into the touch screen display 102. The user interface 160 may also include, e.g., a microphone 164 and speaker 166, e.g., when the computing device 100 is a cellular telephone.

The computing device 100 may further include a transceiver 170, e.g. a cellular modem or a wireless network radio receiver/transmitter that is capable of sending and receiving communications to and from a cellular tower or from a wireless access point, respectively, via antenna 172. The computing device 100 may further include a motion sensor 180, such as three-axis accelerometers or gyroscopes. The motion sensor 180 may be used as part of the user interface 160 by detecting gestures in the form of movement of the computing device 100 or the orientation of the computing device 100 when gestures are detected by the touch screen display 102.

The computing device 100 may further include a means for determining a characteristic of the contact with the touch screen display 102, such as the magnitude of force, the centroid of force of the contact, and the shear force, using the force measurements from the plurality of locations. The means for determining the characteristic of the contact may include the control unit 150 that is connected to communicate with the user interface 160, transceiver 170 and motion sensor 180. The control unit 150 accepts and processes data from the user interface 160, transceiver 170 and motion sensor 180 and controls the operation of the devices, and thus, serves as a means for selecting a command based on the characteristic of the contact and means for processing the command. The control unit 150 may be provided by a processor 152 and associated memory 154, hardware 156, software 158, and firmware 157. The control unit 150 includes a means for controlling the display element 104, means for controlling the touch sensors 110 and means for controlling the force sensors 106, illustrated as a display controller 192, touch sensor controller 194, and force sensor controller 196, respectively. The display controller 192, touch sensor controller 194, and force sensor controller 196 may be implanted in the processor 152, hardware 156, firmware 157, or software 158, i.e., computer readable media stored in memory 154 and executed by processor 152, or a combination thereof. The display controller 192, touch sensor controller 194, and force sensor controller 196 nevertheless are illustrated separately for clarity. For example, touch screen controllers manufactured by Cypress, Inc. may be used as the touch sensor controller 194, as well as the force sensor controller 196. Further, voltage dividers with an A/D convert or other impedance measurement circuits may be used with the resistive force sensors controller 196.

It will be understood as used herein that the processor 152 can, but need not necessarily include, one or more microprocessors, embedded processors, controllers, application specific integrated circuits (ASICs), digital signal processors (DSPs), and the like. The term processor is intended to describe the functions implemented by the system rather than specific hardware. Moreover, as used herein the term "memory" refers to any type of computer storage medium, including long term, short term, or other memory associated with the mobile platform, and is not to be limited to any particular type of memory or number of memories, or type of media upon which memory is stored.

The methodologies described herein may be implemented by various means depending upon the application. For example, these methodologies may be implemented in hardware 156, firmware 157, software 158, or any combination thereof. For a hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof.

For a firmware and/or software implementation, the methodologies may be implemented with modules (e.g., procedures, functions, and so on) that perform the functions described herein. Any machine-readable medium tangibly embodying instructions may be used in implementing the methodologies described herein. For example, software codes may be stored in memory 154 and executed by the processor 152. Memory may be implemented within the processor unit or external to the processor unit. As used herein the term "memory" refers to any type of long term, short term, volatile, nonvolatile, or other memory and is not to be limited to any particular type of memory or number of memories, or type of media upon which memory is stored.

For example, software 158 may include program codes stored in memory 154 and executed by the processor 152 and may be used to run the processor and to control the operation of the computing device 100 as described herein. A program code stored in a computer-readable medium, such as memory 154, may include program code to determine to determine a characteristic of a contact with a touch screen display using signals received from a plurality of force sensors, the characteristic of the contact comprising at least one of a magnitude of force applied normal to a plane defined by the touch screen display, a centroid of force of the contact, and a shear force parallel to the plane defined by the touch screen display; program code to use the characteristic of the contact to select a command; and program code to process the command. The program code stored in a computer-readable medium may additionally include program code to cause the processor to control any operation of the computing device 100 as described further below.

If implemented in firmware and/or software, the functions may be stored as one or more instructions or code on a computer-readable medium. Examples include computer-readable media encoded with a data structure and computer-readable media encoded with a computer program. Computer-readable media includes physical computer storage media. A storage medium may be any available medium that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to store desired program code in the form of instructions or data structures and that can be accessed by a computer; disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

Figure 5:
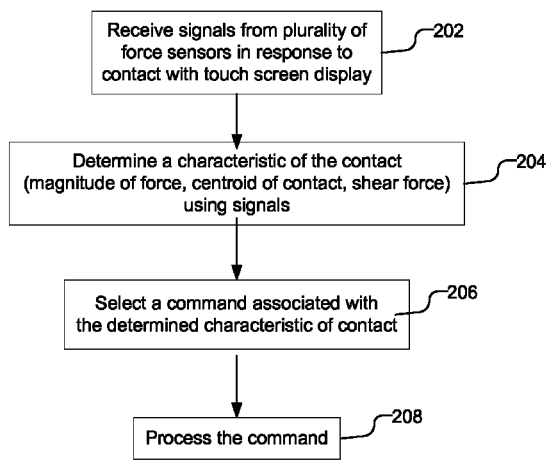
FIG. 5 is a flow chart illustrating using a plurality of force sensors on a touch screen display as a three-dimensional user interface to control the operation of the computing device.

FIG. 5 is a flow chart illustrating using a plurality of force sensors 106 on a touch screen display 102 as a three-dimensional user interface to control the operation of the computing device 100. As illustrated, signals from a plurality of the forces sensors 106 on the touch screen display 102 are received in response to contact with the touch screen display 102 (202). The force sensors 106 need not be located directly under the location of the contact on the touch screen display 102, but may be distributed, e.g., around the perimeter of the touch screen display 102 or in various regions of the touch screen display 102. The signals from the plurality of force sensors 106 are used together and in conjunction with the signals from the touch sensor to determine a characteristic of the contact with the touch screen display 102 (204). The characteristic of the contact includes at least one of the magnitude of the force applied normal to the plane of the touch screen display 102, i.e., along the Z axis, as shown in FIG. 3, the centroid of force of the contact, and a shear force parallel to the plane defined by the touch screen display 102. In one embodiment, the characteristic of the contact is the magnitude of force by itself or with additional information provided by the centroid of contact and/or the shear force. The magnitude of the force, by way of example, may be determined simply by summing the forces individually detected by each of the plurality of force sensors 106. If desired, the force measurement may be converted to a measurement of the pressure applied to the touch screen display 102, e.g., by dividing the force by the known area of the touch screen display 102. Moreover, the force measurement may be converted to a measurement of the pressure applied to the contact area on the touch screen display 102 by first determining the area of the contact, e.g., using the touch sensor 110 that is over display element 104, as shown in FIG. 3, then dividing the force by the contact area. Thus, force and pressure are simply a mathematic conversion and therefore may be considered equivalents. Consequently, force and pressure may be used interchangeably unless otherwise indicated.

Figure 6:
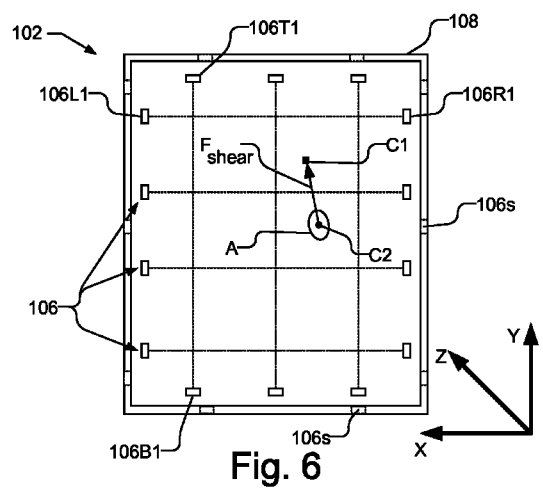
FIG. 6 illustrates a top plan view of the touch screen display with force sensors distributed around the perimeter of the bottom as well as the sides of the touch screen display.

The centroid of force of the contact is along the plane defined by the X and Y axes of the touch screen display 102 may be determined using a weighted average based on the force detected each of the plurality of force sensors and the position of each of the plurality of force sensors 106 (204). If desired, the centroid of the contact may be determined based on the force measured in pairs of the force sensors 106. For example, FIG. 6 illustrates a top plan view of the touch screen display 102 with force sensors 106 distributed around the perimeter of the touch screen display 102. Each force sensor 106 is paired with another force sensor 106 along the X axis or the Y axis, as illustrated with broken lines. For example, force sensor 106T1 is paired with force sensor 106B1 and force sensor 106L1 is paired with force sensor 106R1. The combined force for each force sensor pair can be used as a weighting factor along with the known positions of the force sensors 106 to determine the centroid C1 of the contact along the X and Y axes. Alternatively, the centroid of force may be determining a force vector for each force sensor 106, by multiplying the force applied to a force sensor by the distance of that force sensor from the center of the screen. The centroid of force may then be calculated as the vector sum of all the force vectors.

Additionally, if desired, a shear force caused by the contact on the touch screen display 102 may be determined (204). The shear force, which is the force applied parallel to the plane of the touch screen display 102, i.e., in the plane defined by the X and Y Axes, may be determined by comparing the centroid or point of contact as determined using the plurality of force sensors 106 and the centroid of contact as determined using the touch sensor 110 that is over the display element 104 (illustrated in FIG. 3). FIG. 6, by way of example, illustrates the area of contact A as determined by the touch sensor 110, from which the centroid C2 of contact can be determined, e.g., as the geometric center of the area of contact A. The shear force $F_{shear}$ is the vector between the centroid C1 of the contact measured by the plurality of force sensors 106 and the centroid C2 of the contact measured by the touch sensor 110. Thus, when centroid C1 coincides with centroid C2, there is no shear force, i.e., all the force is applied along the Z axis, while the larger the magnitude of the vector between centroid C1 and centroid C2, the larger the shear force $F_{shear}$. Alternatively, the shear force can be determined by arranging additional force sensors 106s around the edge of the touch screen display 102, i.e., between the edge of the touch screen display 102 and the housing 108 (as illustrated in FIG. 6), as opposed to underneath the touch screen display 102. Shear force may also be determined by detecting a shift in the area of a finger pressed against the touch screen display 102, as measured by the touch sensor 110.

Referring back to FIG. 5, the computing device 100 selects a command associated with the detected magnitude of force, and optionally, the centroid of contact and shear force (206). The command that is associated with the detected magnitude of force may be dependent on the application or program that is in use by the computing device 100 or other parameters, such as the orientation of the computing device 100 as determined by motion sensor 180. The command may include, among other things, the selection of an item displayed on the touch screen display 102, the manipulation of data, e.g., text and/or image, or the control of the computing device 100, e.g., increasing or decreasing volume. The computing device 100 then processes the command (208) to perform the desired action.

Figure 7:
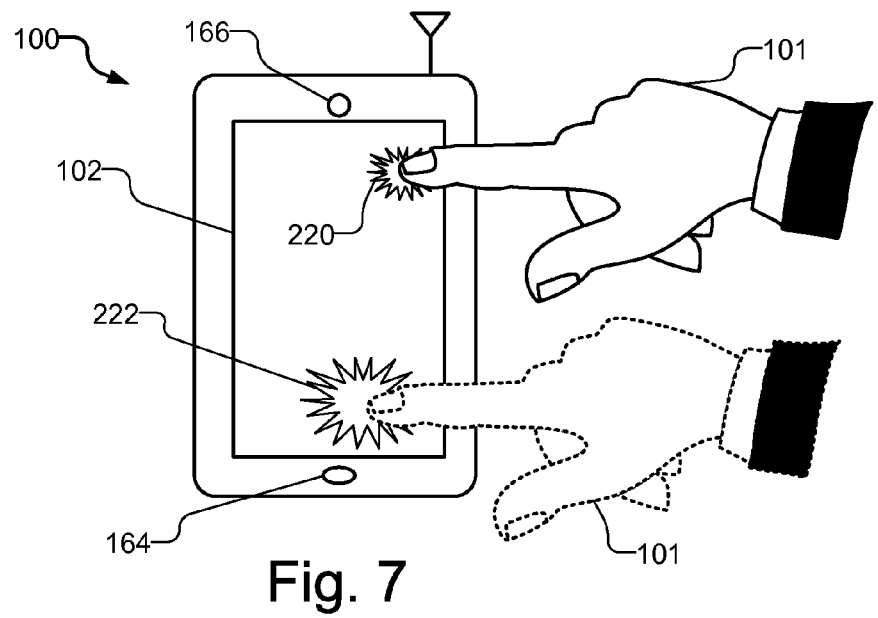
FIG. 7 illustrates the computing device with a user applying a detectable force to the touch screen display.

FIG. 7 illustrates the computing device 100 with a user 101 applying a force to the touch screen display 102. Computing device 100 is illustrated as a mobile phone or smart phone including a speaker 166 and microphone 164, but it should be understood that computing device 100 is not limited thereto. The user's 101 contact with the touch screen display 102 is illustrated as a starburst 220. As illustrated throughout this document, the larger the size of the starburst, the greater the force that is being applied to the touch screen display 102. Accordingly, starburst 222 illustrates a greater amount of force applied to the touch screen display 102 by the user 101 compared to starburst 220. The magnitude of force applied to the touch screen display 102, and if desired, the centroid of contact and any shear force may be determined by the computing device 100 and used to select and process different commands.

Figure 8:
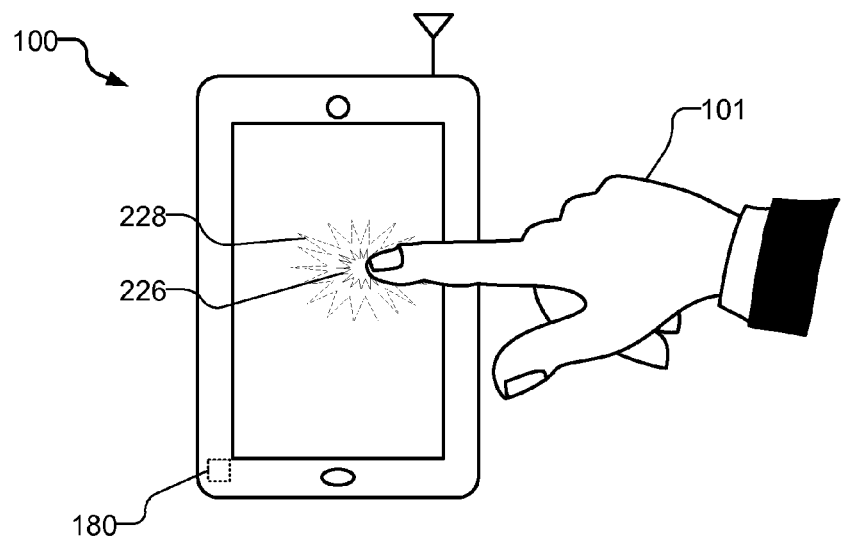
FIG. 8 illustrates the computing device with a dynamic adjustment of the force threshold in response to movement of the computing device.

In one embodiment, different amounts of force may are required to select a command, such as selecting an item or manipulate data on the touch screen display 102, i.e., a dynamic threshold adjustment, in response to the environment context. FIG. 8 illustrates dynamic threshold adjustment. As illustrated in FIG. 8, the computing device 100 may include a motion sensor 180, such as a 3-axis accelerometer or gyroscope, which detects the amount of movement of the computing device 100. Because a user is more likely to inadvertently select an item on the touch screen display 102 when subject to a large amount of motion, such as on a bus or train, the force threshold necessary to register the selection may be adjusted to require an increased force. Thus, for example, the force associated with starburst 226 in FIG. 8 may be adequate to select a command when the user 101 and computing device 100 are stationary, however when subjected to a large amount of motion, the force threshold is increased to require a greater force illustrated by starburst 228 to select the command. The location of the contact on the touch screen display 102 may be determined as the centroid of contact, as determined using the force sensors 106, or based a touch sensor 110, while the magnitude of force is determined by the plurality of force sensors 106. The dynamic threshold adjustment may be a user configurable setting.

Figure 9:
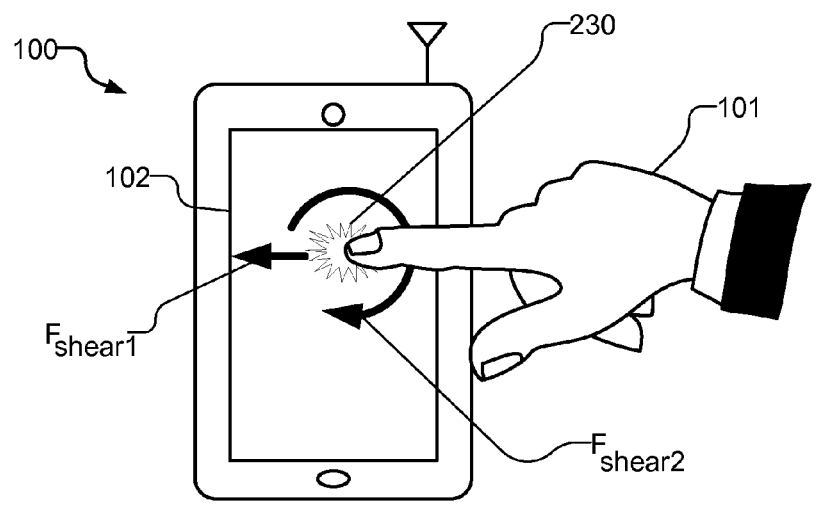
FIG. 9 illustrates the computing device using the shear force detected from a contact to select a command, such as manipulating data displayed on the touch screen display.

FIG. 9 illustrates the use of shear force with the computing device 100 to select a command, such as manipulating data (text, graphical or other) displayed on the touch screen display. The shear force may also be used to control the operation of an application on the computing device 100. The shear force may be determined as described above. As illustrated in FIG. 9, the shear force $F_{shear1}$ is applied and detected at one location, illustrated with starburst 230 and in a single direction, which may be associated with different commands based on the direction, e.g., pressing left or right may respectively zoom in or zoom out of an image, turn pages of an electronic document or book forward or backward, etc. Moreover, the magnitude of the shear force may be used to control the speed with which the command is performed, e.g., a small shear force may cause the computing device 100 to slowly zoom in on an image or turn pages of a electronic document, while a large shear force may cause the computing device 100 to relatively quickly zoom in on the image or turn the pages of the electronic document. Additionally, a shear force $F_{shear2}$ applied in multiple directions, e.g., in a circular or rotational motion, may be associated with different commands based on direction, for example, clockwise or counter-clockwise directions may be associated with increasing or decreasing volume. The use of shear force, thus, allows a user to control actions that have a positive and negative scalar, e.g., volume up or down, zoom in or out, turn pages left or right, without being required to lift the finger and to recognize and touch multiple areas of the touch screen display 102 as is required by conventional devices.

Figure 10:
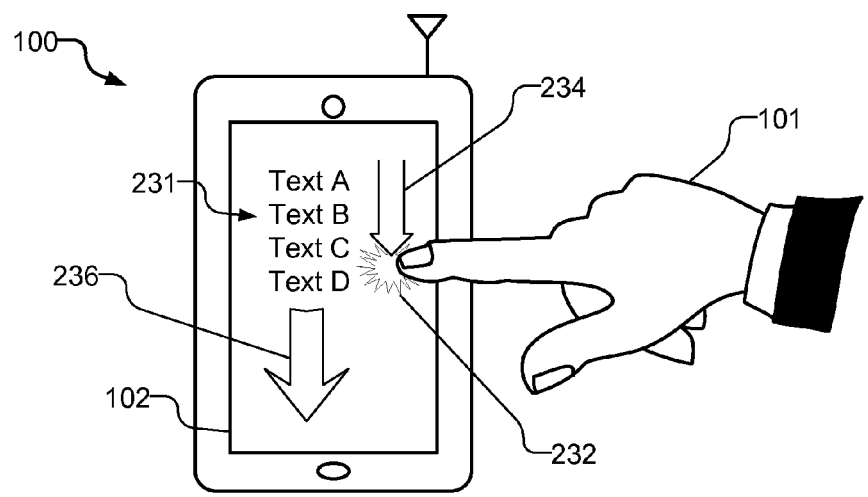
FIG. 10 illustrates the computing device manipulating data displayed on the touch screen by controlling the speed of scrolling data in response to the magnitude of force applied to the touch screen display.

The detected magnitude of force applied to the touch screen display 102 may be used to vary the manipulation of data on the touch screen display 102. For example, the magnitude of force may be used to control the rate that data is scrolled on the touch screen display. FIG. 10 illustrates, by way of example, controlling the rate of scroll of text 231 in response to the magnitude of force, illustrated by starburst 232, applied to the touch screen display 102. The user 101 may drag a finger up or down (or across) the touch screen display 102, as illustrated by arrow 234, which is mapped to the direction of the desired scroll, illustrated by arrow 236. The user 101 can stop the gesture and while holding the finger at one location may adjust the rate of the scroll by changing the magnitude of force 234 applied to the touch screen display 102, e.g., more force is associated with faster scrolling. Alternatively, the rate of the scroll may be controlled by the force applied while dragging the finger. As described above, if desired, the direction of the scroll may be controlled without movement of the user's finger, based on the direction of shear force. The data that is scrolled may be, e.g., a web page, a document file or any other text, as well as graphical data, such as an image gallery, or any other type of data.

Figure 11:
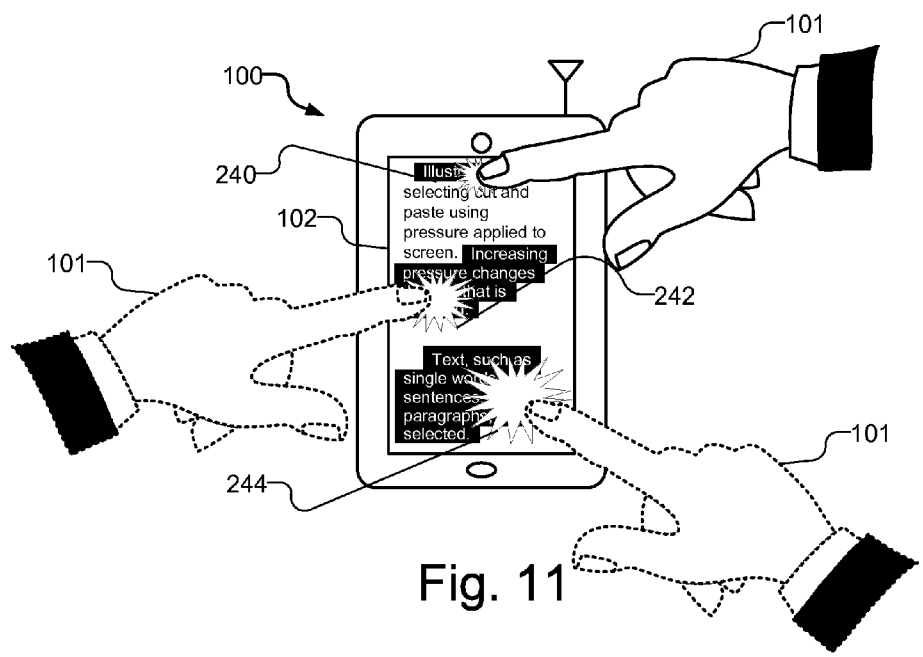
FIG. 11 illustrates the computing device manipulating data displayed on the touch screen by controlling the quantity of data on the touch screen display that is selected in response to the magnitude of force applied to the touch screen display.

FIG. 11 illustrates another example of varying the way that data on the touch screen display 102 is manipulated in response to the detected magnitude of force applied to the touch screen display 102. FIG. 11 illustrates using the detected magnitude of force to vary the selection of data, which is illustrated as textual, but may be graphical, such as images in an image gallery, or other type of data, on the touch screen display 102. As illustrated, a user 101 may press softly, as indicated by starburst 240, to select a relatively small portion of the text, e.g., a letter or word as indicated by the highlighting in FIG. 11, that is located at centroid of the contact, which may be determined by the force sensors 106 as described above, or the touch sensor 110 if present. With moderate pressure, indicated by starburst 242, additional data is selected, such as a sentence located at the contact position. With firm pressure, even more data may be highlighted, such as the entire paragraph located at the contact position. If desired, additional gradients of force may be used to select additional levels of data, such as a page or all the text.

Figure 12:
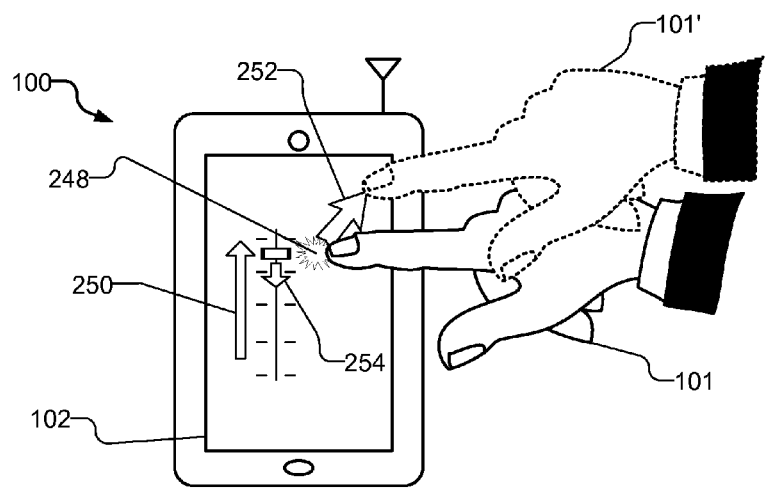
FIG. 12 illustrates the computing device controlling an operation of an application on the computing device by reversing a selected action in response to a rate of change of the magnitude of force.

FIG. 12 illustrates an example of using the detected magnitude of force to control an operation of an application on the computing device 100. FIG. 12 illustrates, by way of example, controlling the adjustment of volume of an application based on the detected force, indicated by starburst 248, to the touch screen display 102. The rate of volume adjustment, indicated by arrow 250, may be controlled based on the amount force applied, i.e., increased force produces a faster increase in volume while a decreased force produces a slower increase in the volume. Additionally, the rate of change in the magnitude of force applied to the touch screen display 102 may be used to control the computing device 100. For example, while applying a force on the touch screen display 102 controls an adjustment in one direction, e.g., increasing the volume, a rapid decrease in the force that is applied to the touch screen display 102, e.g., by quickly removing the finger from the touch screen display 102 as indicated by arrow 252 and the hand 101' of the user, controls the adjustment in the opposite direction, e.g., decreasing the volume, as indicated by arrow 254. The magnitude of the rate of change may control the amount of adjustment in the opposite direction. Thus, for example, when increasing the volume, if user 101 inadvertently overshoots the desired volume, the natural reaction of quickly removing the finger will decrease the volume, thereby avoiding the need for the user to locate and press the appropriate button to lower the volume. If the rate of change is below a predetermined threshold, then no post-processing action, e.g., lowering the volume, is necessary.

Figure 13A:
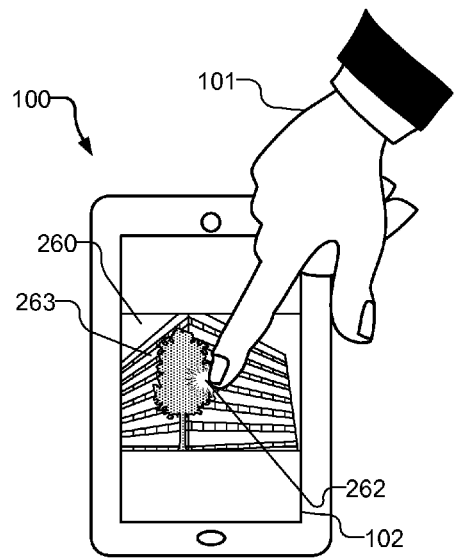
FIGS. 13A and 13B illustrate the computing device controlling an operation of an application on the computing device by selecting between a foreground object and a background object displayed on the touch screen display, e.g., in an Augmented Reality (AR) type application, in response to the magnitude of force applied to the touch screen display.
Figure 13B:
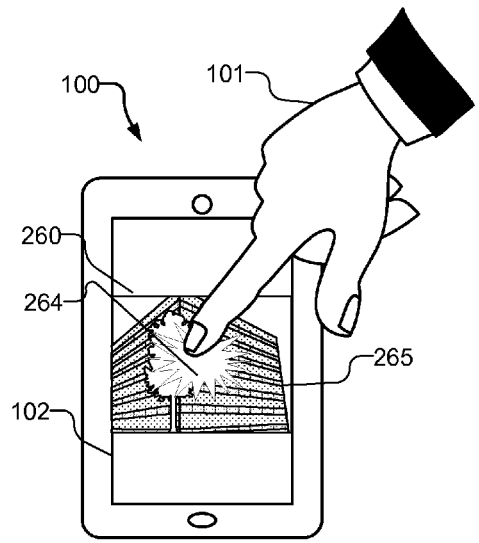

FIGS. 13A and 13B illustrate another example of using the detected magnitude of force to control the computing device 100 in the form of selecting an object in an augmented reality (AR) context based on the force applied to touch screen display. In AR applications, a real world object is imaged and displayed on the touch screen display along with computer generated information, such as an image or textual information. For example, AR can be used to provide information, either graphical or textual, about a real world object, such as a building or product. The computer generated information displayed may be based on the real world object in the image that is selected. As illustrated in FIGS. 13A and 13B, the AR application may use not only the contact location along the X and Y axes, as shown in FIG. 1, to select an item in the image 260, but may also include depth along the Z axis, based on the force of the contact. For example, with the use of a three-dimensional (3D) camera, on the computing device 100, the distance to real world objects may be determined Thus, by pressing firmly or lightly will assist the AR engine select the desired real world object in the image for additional processing. For example, FIG. 13A illustrates a light force, starburst 262, applied by the user 101 to the touch screen display 102 to select an item, e.g., a tree 263, in the foreground. FIG. 13B illustrates a strong force, starburst 264, applied at the same location as the contact shown in FIG. 13A, but based on the increased force, an item, e.g., a building 265, in the background of the image 260 is selected.

Figure 14:
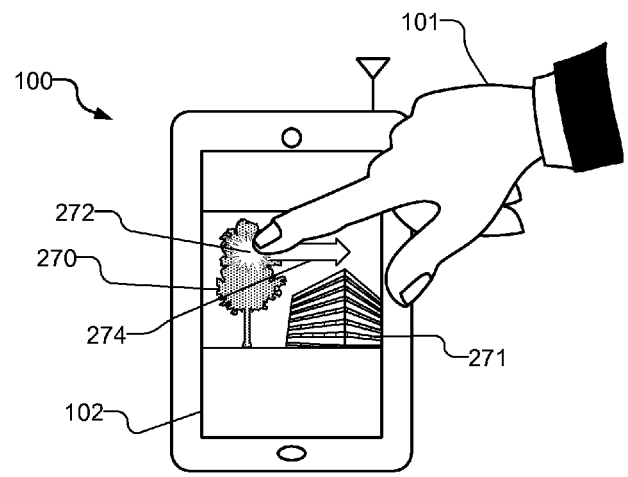
FIG. 14 illustrates the computing device controlling an operation of an application on the computing device by selecting a focal range for a camera on the computing device in response to the magnitude of force applied to the touch screen display.

FIG. 14 illustrates another example of using the detected magnitude of force to control the computing device 100 in the form of selecting a focal range in a camera application. Conventionally, phone cameras either use a center weighted, windowed, or face detection based auto focus mechanism. In such systems, the user has to hope that the camera has adjusted to the correct focal distance and that the shot is captured with minimal level of blurriness in the desired region. As illustrated in FIG. 14, the user 101 can select an item, e.g., the tree 270 in the foreground, that should be in focus. The user may adjust the depth of focus by adjusting the force, illustrated by starburst 272, applied to the touch screen display 102 or by moving a finger across the touch screen display 102 with a lighter force, as illustrated by arrow 274, to other areas that the user 101 would like to be in focus, e.g., building 271 in the background. In this manner, the computing device 100 can determine that the user 101 would like both the tree 270 and the building 271 in focus and may apply an appropriate focal position. The difference in the initial force 272 and the force used while moving the finger 274 may be used to weight the focal position, i.e., a strong force on the tree 270 while moving the finger 274 with a light force may indicate that the focal position should be placed somewhere between the two objects, more towards the lens position where the tree 270 is sharp.

Figure 15:
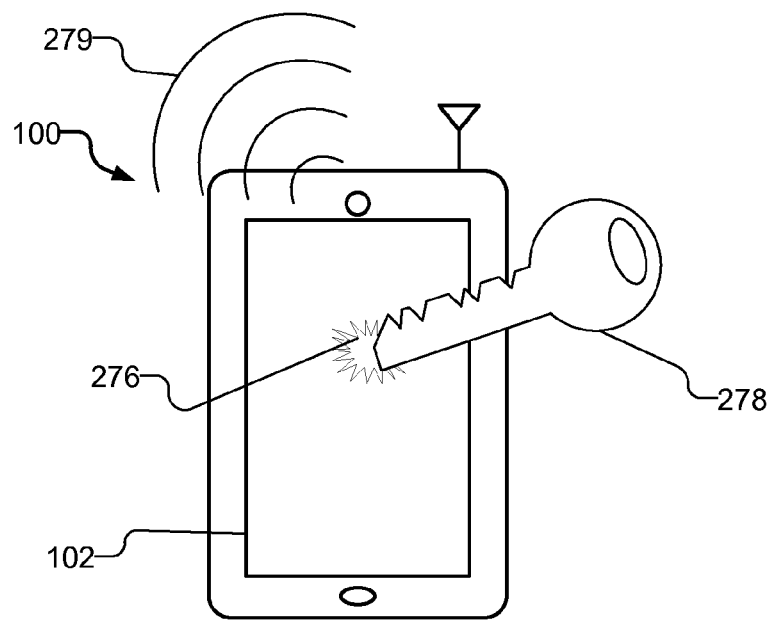
FIG. 15 illustrates the computing device controlling an operation of an application on the computing device by producing an alarm indicating potential damage to the touch screen display in response to the magnitude of force applied to the touch screen display.

FIG. 15 illustrates another example of using the detected magnitude of force to control the computing device 100 in the form of providing an alarm when the applied force over an area is likely to damage the touch screen display 102. The force values from the force sensors 106 on the touch screen display 102 may be continuously monitored by the computing device 100, along with the area of contact from the touch sensor 110. If the computing device 100 measures an excessive force, indicated by starburst 276, for the contact area of an object, such as from the tip of key 278 pressing against the touch screen display 102, the computing device 100 may provide an alarm 279, which may be audible or vibrating. Excessive force may be determined by comparing the force to one or more thresholds that are dependent on the contact area and the performance characteristics of the touch screen display 102. Alternatively, the pressure applied to the touch screen display 102 may be determined based on the force and contact area, and the pressure may be compared to one or more thresholds. Multiple thresholds may be used as the amount of force that can be tolerated by the touch screen display 102 may differ based on the contact area. For example, a higher force may be tolerated over a relatively large contact area, such as from a finger tip, while a lower force over a small contact area, such as from the tip of a key that may scratch the touch screen display 102, may trigger the alarm. A maximum threshold over the entire touch screen display 102, e.g., 30 N, may be used to indicate that the user is sitting on the computing device 100. When a user hears the alarm 279 from the computing device 100, the user knows that the touch screen display 102 is about to be damaged and may take corrective action.

Figure 16:
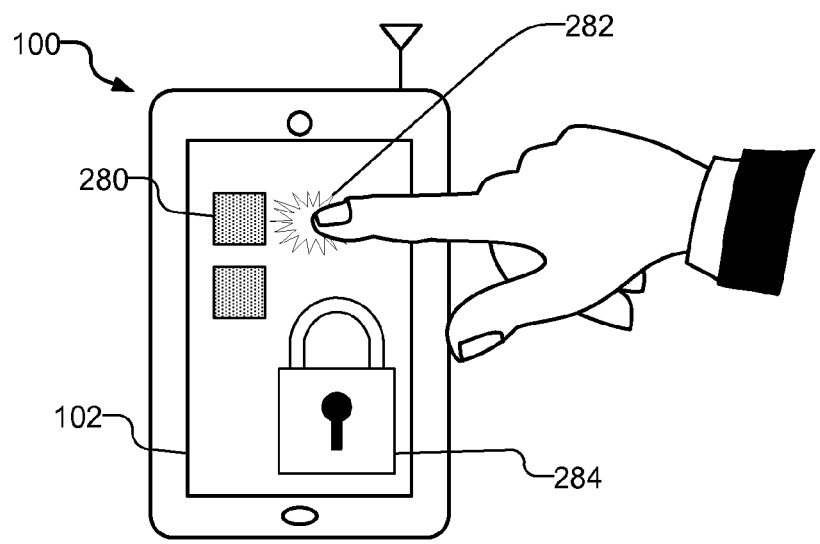
FIG. 16 illustrates the computing device controlling an operation of an application on the computing device by locking the computing device in response to the magnitude of force applied to the touch screen display.

FIG. 16 illustrates another example of using the detected magnitude of force to control the computing device 100 in the form of locking the computing device 100 based on the magnitude of force applied to the touch screen display 102. For example, pressing the touch screen display 102 at a location devoid of selectable icons or buttons 280 with a force above a threshold magnitude, indicated by starburst 282, for a length of time greater than a time threshold may lock the computing device 100 or the touch screen display 102, as indicated by lock 284.

Figure 17:
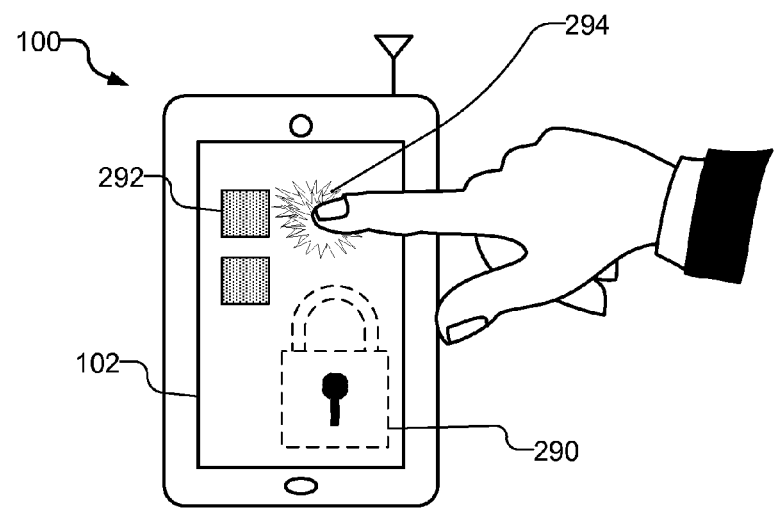
FIG. 17 illustrates the computing device controlling an operation of an application on the computing device by using a magnitude of force greater than a threshold to control the computing device while the computing device is at least partially locked.

FIG. 17 illustrates another example of using the detected magnitude of force to control the computing device 100 in the form of requiring a force on the touch screen display 102 that is above a threshold to trigger a desired action. For example, the computing device 100 may be in a partially locked state, as indicated by lock 290, in which only some features may be used or controlled, while other features are disabled. One feature that may be used or controlled in a partially locked state may be, e.g., a media player application. Media may be played with the media player application, while the computing device 100 is in a partially locked state. However, the touch screen display 102 maybe partially disabled so that other items 292 cannot be inadvertently selected or running applications cannot be inadvertently closed. For example, the touch sensor 110 if used may be disabled, and response to the force sensors 106 may be disabled unless the applied force is greater than a threshold. Thus, a parent may allow a child to view media on the computing device 100 without concern that the child may pausing or closing the media inadvertently by touching the touch screen display 102. The computing device 100, however, may still be controlled using contact with the touch screen display 102 that has a force above a predetermined threshold, e.g., a force greater than a child can apply. The partially locked state may be entered, e.g., using a specific pattern of contacts with force above a threshold, e.g., three hard presses illustrated by starbursts 294 at a location where there are no selectable icons 292. The partially locked state may be removed by repeating the gesture.

Figure 18:
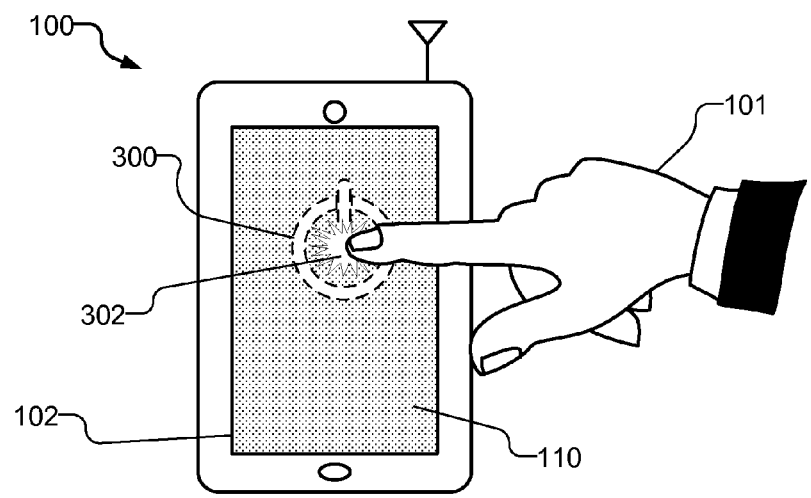
FIG. 18 illustrates the computing device controlling an operation of an application on the computing device by disabling the touch sensor until a magnitude of force on the touch screen display is above a threshold.

FIG. 18 illustrates another example of using the detected magnitude of force to control the computing device 100 in the form of disabling the touch sensor 110 until a force on the touch screen display 102 is applied that is above a threshold. Capacitive touch screens in conventional devices remain active as long as the device is active. Thus, when watching a long video, the capacitive touch screen runs unnecessarily the entire time, even though the user's interaction with the touch interface is minimal. Moreover, to wake many conventional devices, an electromechanical button must be pressed to wake up the capacitive touch screen. With the use of force sensors 106, computing device 100 may turn off the capacitive touch sensor controller 194 (illustrated in FIG. 4) and thus disable the touch sensor 110 when a user 101 is passively consuming content, such as a movie or reading a book, but would turn on (as indicated by the "on" icon 300), once a force greater than a threshold (illustrated by starburst 302) as detected by force sensors 106 is applied to the touch screen display 102. The force sensors 106 consume little current when active compared to capacitive touch sensors 110, and thus, power savings may be achieved.

Figure 19:
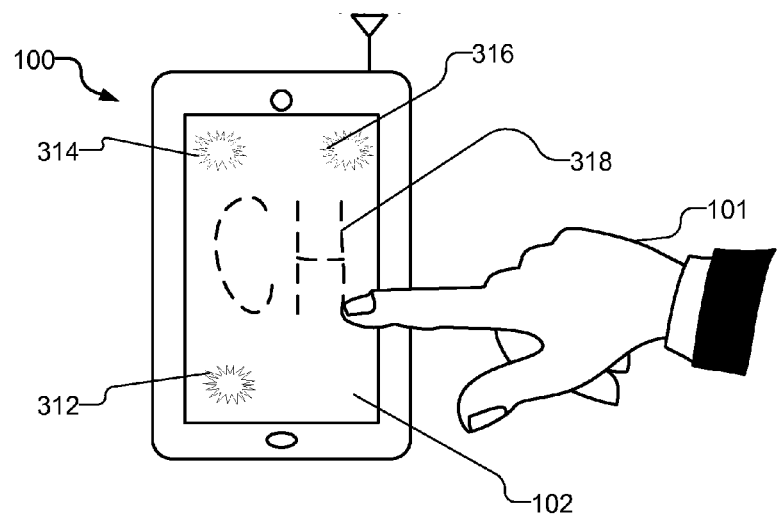
FIG. 19 illustrates the computing device controlling an operation of an application on the computing device by controlling the computing device using the force sensors while the computing device is in low power mode.

FIG. 19 illustrates another example of using the detected magnitude of force to control the computing device 100 while in low power mode. The most power hungry portion of today's mobile phone is the LCD display and the accompanying backlights. One of the advantages of the use of force sensors 106 is that resistive force sensing technologies, such as those from Interlink, draws little or no current in a steady state, i.e., when no force is applied. The force sensors 106 operate at high impedance normally, and only once a force is applied, is the impedance lowered whereby the flow of electrons measures the amount of a force. Thus, by detecting the force applied to the touch screen display 102 along with monitoring the centroid of contact, a user can control the computing device 100 using patterns of contact and/or gestures with minimal power draw. Thus, for example, one embodiment, when the battery level of the computing device 100 drops below a threshold level, e.g., 10%, the computing device 100 disable the LCD display and touch sensors, or may be placed in a sleep mode but continue to sample the force sensors 106. Different patterns of contact may be used to control the computing device 100. For example, while the computing device 100 is in sleep mode but sampling the force sensors 106, contacting the bottom left, top left and top right corners of the touch screen display, as indicated by starbursts 312, 314, 316 in FIG. 19 may wake up the computing device 100, but leave the LCD and any touch sensor 110 off. The user 101 may use simple gestures 318 by pressing on the touch screen display 102 in patterns, which are detected by tracking the location of the centroid of contact. As illustrated in FIG. 19, for example, if the user 101 draws a "C" followed by an "H" on the touch screen display, the computing device 100 may call home. The gestures may be user configurable. Thus, the user 101 can still have some interaction with the computing device 100, but do so in such a fashion that power is conserved.

Figure 20:
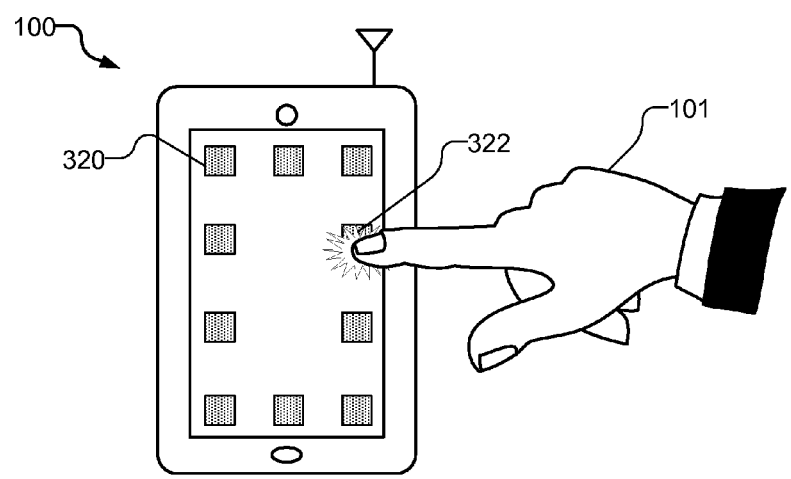
FIG. 20 illustrates another example of the computing device controlling an operation of an application on the computing device by controlling the computing device using the force sensors while the computing device is in low power mode.

FIG. 20 illustrates another example of using the detected magnitude of force to control the computing device 100 while in low power mode. In a device with a low-power bistable display, such as an e-ink or Mirasol® display, a user is likely to assume that any time the device is touched, it will register the keypress or wake event. However, in an idle-state, running the capacitive or resistive touch sensor controller 194 (FIG. 4) would consume much more power than using force sensors 106 and detecting the centroid of contact. Thus, by using a placement and size of selectable icons 320 that corresponds to a geometry that matches the capabilities of the force sensors 106, the computing device 100 can use a hierarchical touch system that uses force (as illustrated by starburst 322) to select from a limited set of modes of operation. For example, an ebook reader with force sensors 106 could have a set of icons placed radially around the center of the touch screen display such that the centroid of contact determined using the force sensors 106 can be used to select icons.

Figure 21:
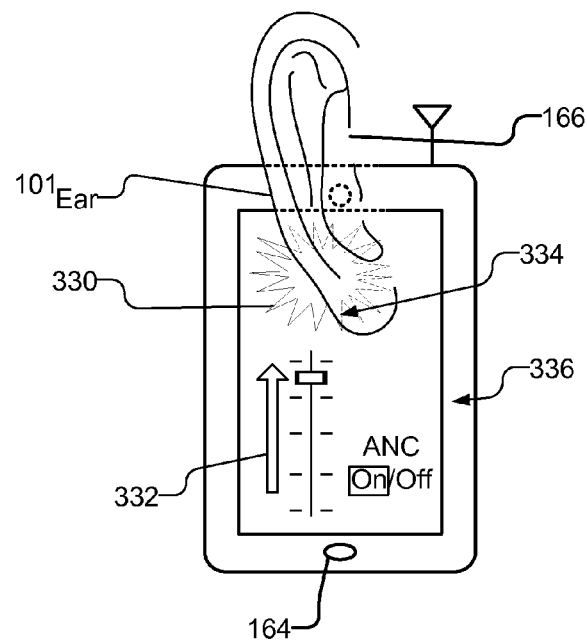
FIG. 21 illustrates the computing device controlling an operation of an application on the computing device by variably adjusting at least one of a speaker volume, audio frequency equalization, and active noise cancellation in response to the magnitude of force applied to the touch screen display.

FIG. 21 illustrates another example of using the detected magnitude of force to control the computing device 100, which may be, e.g., a cellular telephone, in the form of controlling the volume of the speaker 166 based on a force applied to the touch screen display 102 by the user illustrated by ear $101_{ear}$. When the computing device 100 determines that, e.g., that a phone application is being used, the magnitude of the force (illustrated by starburst 330) at which the touch screen display 102 is pressed against the ear $101_{ear}$, as detected by the force sensors 106, combined with a measurement of the ambient noise level via a voice or noise-reference microphone 164, may be used to adjust the speaker 166 volume, as indicated by arrow 332 and volume control bar 334, and received audio frequency equalization for enhanced intelligibility and to compensate for the effects of leakage. For example, when a user is in a loud environment, pressing the computing device 100 harder to the ear $101_{ear}$ would automatically increase the speaker 166 volume and provide a boost in the 3-4 kHz region for enhanced intelligibility. Additionally, the magnitude of force 330 applied to the touch screen display 102 may be used to control Active Noise Cancellation (ANC) technology in computing device 100, which depends on a low-leakage mechanical coupling to the ear $101_{ear}$. When leakage is present, the ANC effect is diminished and will quickly drop below the perceptible threshold. Thus, it would be advantageous to turn off the ANC algorithm and microphone(s) in order to conserve power. Thus, as illustrated in FIG. 21, when the force applied by the ear $101_{ear}$ is sufficiently large, i.e., above a threshold, the ANC 336 may be activated, and otherwise the ANC 336 is turned off. Further, the magnitude of force 330 applied to the touch screen display 102 may be used to control other operations of the computing device 100, such as one dynamic range compression, limiting, and gain control, such as Automatic Gain Control or Receive Volume Enhancement (RVE), in which sub-band gains in the receive signal are controlled based on the environmental noise spectrum that is detected for each sub-band by microphone 164. For example, when a user is in a loud environment, pressing the computing device 100 harder to the ear $101_{ear}$ would automatically adjust the compression, limiting, or gain to enhance intelligibility.

Figure 22:
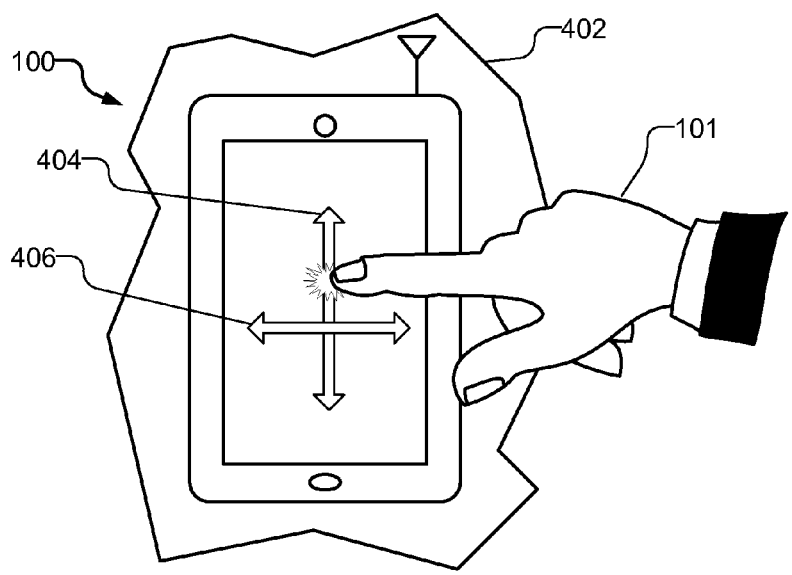
FIG. 22 illustrates the computer device behind a protective element, such as a pocket of a garment or a holder, with a user producing gestures to interact with the computing device through the protective element.

Moreover, because the force sensors 106 measure the magnitude and location of force applied to the display 102, as opposed to measuring capacitance, the force sensors 106 may be used to detect gestures through a protective element, such as a pocket of a garment or a holder that is pliable. FIG. 22 illustrates the computer device 100 behind a protective element 402, such as a pocket of a garment or a holder. The user 101 is illustrated as contacting the computing device 100 through the protective element 402 to produce a gesture by pressing on the touch screen display 102 in a pattern, for example, in a vertical (up or down) gesture 404 or a horizontal (right or left) gesture 406 which are detected by tracking the location of the centroid of contact. Commands that may be associated with the gesture includes, e.g., increasing or decreasing the volume of the speaker in response to the vertical gesture 404, and selecting a next or previous item (e.g., song, voice mail, email, etc) in response to the horizontal gesture 406. Thus, the user 101 can interact with the computing device 100 while the computing device 100 is in the protective element 402. Of course, additional or alternative gestures may be used and additional or alternative commands may be associated with the gestures. Moreover, the gestures and associated command may be user configurable. Additionally, to avoid unintentional interaction with the computing device 100, a specific sequence of contacts, e.g., three sets of double taps, may be required to permit interaction with the computing device 100 when the computing device 100 is in the protective element 402, which may be determined using, e.g., a light sensor.

Although the present invention is illustrated in connection with specific embodiments for instructional purposes, the present invention is not limited thereto. Various adaptations and modifications may be made without departing from the scope of the invention. Therefore, the spirit and scope of the appended claims should not be limited to the foregoing description.

What is claimed is:

1. A method, comprising:
receiving signals from a plurality of force sensors coupled between a touch screen display and a housing of a computing device, the signals received in response to contact with the touch screen display, wherein the plurality of force sensors are arranged around a perimeter of a bottom surface of the touch screen display;
receiving signals from a touch sensor on the touch screen display;
determining a shear force from the contact with the touch screen display using the signals from the plurality of force sensors and the signals from the touch sensor, the shear force being parallel to a plane defined by the touch screen display, wherein determining the shear force comprises:
determining a centroid of force of the contact using the signals received from the plurality of force sensors;
determining an area of contact using the signals received from the touch sensor on the touch screen display;
determining a centroid of the area of contact; and
using a difference between the centroid of the area of contact and the centroid of force to determine the shear force;
using the shear force from the contact to select a command; and
processing the command to control the computing device.

2. The method of claim 1, wherein the plurality of force sensors are resistive force sensors.

3. The method of claim 1, wherein the command comprises manipulating data displayed on the touch screen display.

4. The method of claim 3, wherein manipulating data displayed on the touch screen display comprises controlling a speed of scrolling data displayed on the touch screen display in response to a magnitude of force.

5. The method of claim 3, wherein manipulating data displayed on the touch screen display comprises controlling a quantity of data on the touch screen display that is selected in response to a magnitude of force.

6. The method of claim 1, wherein the command comprises controlling an operation of an application on the computing device.

7. The method of claim 6, the method further comprising determining a rate of change in a magnitude of force, wherein controlling the operation of the application comprises at least partially reversing a selected action in response to the rate of change of the magnitude of force being greater than a threshold.

8. The method of claim 6, wherein controlling the operation of the application comprises selecting between a foreground object and a background object displayed on the touch screen display in response to a magnitude of force applied to the touch screen display.

9. The method of claim 6, wherein controlling the operation of the application comprises selecting a focal range for a camera on the computing device in response to a magnitude of force applied to the touch screen display.

10. The method of claim 6, wherein controlling the operation of the application comprises producing an alarm indicating potential damage to the touch screen display in response to a magnitude of force over the area of contact being greater than a threshold.

11. The method of claim 6, wherein controlling the operation of the application comprises locking the computing device in response to a magnitude of force being greater than a threshold and a location of contact on the touch screen display.

12. The method of claim 6, wherein controlling the operation of the application comprises disabling the touch sensor on the touch screen display in response to a magnitude of force being greater than a threshold and a location of contact on the touch screen display.

13. The method of claim 12, wherein the touch sensor is at least one of a capacitive touch sensor and a resistive touch sensor.

14. The method of claim 6, wherein controlling the operation of the application comprises using a magnitude of force and the centroid of force to control the computing device while the touch sensor on the touch screen display is disabled.

15. The method of claim 6, wherein controlling the operation of the application comprises variably adjusting at least one of a speaker volume, audio frequency equalization, active noise cancellation, dynamic range compression, limiting, and gain control in response to a magnitude of force applied to the touch screen display.

16. The method of claim 1, wherein the plurality of force sensors detect finger movement through a protective element.

17. The method of claim 16, wherein the protective element is a pocket of a garment or a holder.

18. A computing device, comprising:
a housing;
a touch screen display comprising a display and a plurality of force sensors coupled between the housing and the display, wherein the plurality of force sensors are arranged around a perimeter of a bottom surface of the touch screen display, wherein the touch screen display further comprises a touch sensor coupled to the display;
a processor connected to the plurality of force sensors, and the touch sensor;
memory connected to the processor; and
software held in the memory and run in the processor to cause the processor to determine a shear force from a contact with the touch screen display using signals received from the plurality of force sensors and signals received from the touch sensor, the shear force being parallel to a plane defined by the touch screen display, to use the shear force from the contact to select a command, and to process the command to control the computing device, wherein the software held in the memory and run in the processor causes the processor to determine a centroid of force of the contact using the signals received from the plurality of force sensors, determine an area of contact using the signals from the touch sensor, determine a centroid of the area of contact, and to determine the shear force as a difference between the centroid of the area of contact and the centroid of force.

19. The computing device of claim 18, wherein the plurality of force sensors are resistive force sensors.

20. The computing device of claim 18, wherein the software held in the memory and run in the processor causes the processor to select a command to control a speed of scrolling data displayed on the display in response to a magnitude of force.

21. The computing device of claim 18, wherein the software held in the memory and run in the processor causes the processor to select a command to control a quantity of data on the display that is selected in response to a magnitude of force.

22. The computing device of claim 18, wherein the software held in the memory and run in the processor causes the processor to determine a rate of change in a magnitude of force, and to cause the processor to select a command to at least partially reverse a selected action in response to the rate of change of the magnitude of force being greater than a threshold.

23. The computing device of claim 18, wherein the software held in the memory and run in the processor causes the processor to select a command to select between a foreground object and a background object displayed on the display in response to a magnitude of force.

24. The computing device of claim 18, further comprising a camera with a selectable focal range, wherein the software held in the memory and run in the processor causes the processor to select a command to select a focal range for the camera in response to a magnitude of force.

25. The computing device of claim 18, wherein the software held in the memory and run in the processor causes the processor to select a command to produce an alarm indicating potential damage to the display in response to a magnitude of force over the area of contact being greater than a threshold.

26. The computing device of claim 18, wherein the software held in the memory and run in the processor causes the processor to select a command to lock the computing device in response to a magnitude of force being greater than a threshold and a location of contact on the touch screen display.

27. The computing device of claim 18, wherein the software held in the memory and run in the processor causes the processor to select a command to disable the touch sensor in response to a magnitude of force being greater than a threshold and a location of contact on the touch screen display.

28. The computing device of claim 27, wherein the touch sensor is at least one of a capacitive touch sensor and a resistive touch sensor.

29. The computing device of claim 18, wherein the software held in the memory and run in the processor causes the processor to control the computing device with a magnitude of force and the centroid of force while the touch sensor in the touch screen display is disabled.

30. The computing device of claim 18, wherein the software held in the memory and run in the processor causes the processor to adjust at least one of volume of a speaker, audio frequency equalization, active noise cancellation, dynamic range compression, limiting, and gain control in response to a magnitude of force applied to the touch screen display.

31. The computing device of claim 18, wherein the plurality of force sensors detect finger movement through a protective element.

32. The computing device of claim 31, wherein the protective element is a pocket of a garment or a holder.

33. A system comprising:
means for receiving force measurements from a plurality of locations of a touch screen display in response to contact with the touch screen display, wherein the means for receiving force measurements are arranged around a perimeter of a bottom surface of the touch screen display;
means for receiving signals from a touch sensor on the touch screen display;
means for determining a shear force from the contact with the touch screen display using force measurements from the plurality of locations and the signals from the touch sensor, the shear force being parallel to a plane defined by the touch screen display, wherein the means for determining the shear force comprises:
means for determining a centroid of force of the contact using signals received from the means for receiving force measurements;
means for determining an area of contact using the signals received from the touch sensor on the touch screen display;
means for determining a centroid of the area of contact; and
means for using a difference between the centroid of the area of contact and the centroid of force to determine the shear force;
means for selecting a command based on the shear force from the contact;
means for processing the command.

34. A non-transitory computer-readable medium including program code stored thereon, comprising:
program code to determine a shear force from a contact with a touch screen display using signals received from a plurality of force sensors arranged around a perimeter of a bottom surface of the touch screen display and signals received from a touch sensor on the touch screen display, the shear force being parallel to a plane defined by the touch screen display, wherein the program code to determine the shear force comprises:
program code to determine a centroid of force of the contact using the signals received from the plurality of force sensors;
program code to determine an area of contact using the signals received from the touch sensor on the touch screen display;
program code to determine a centroid of the area of contact; and
program code to use a difference between the centroid of the area of contact and the centroid of force to determine the shear force;
program code to use the shear force from the contact to select a command; and
program code to process the command.

* * * * *